UNITED STATES PATENT OFFICE.

JOHN C. GOODRIDGE, JR., OF NEW YORK, N. Y.

IMPROVEMENT IN METHODS OF LAYING CONCRETE UNDER WATER.

Specification forming part of Letters Patent No. 188,123, dated March 6, 1877; application filed January 29, 1877.

*To all whom it may concern:*

Be it known that I, JOHN C. GOODRIDGE, Jr., of the city of New York, county of New York, State of New York, have invented a new and useful Improvement in the Method of Laying Concrete under Water; and I hereby declare that the following is a full and exact description thereof, which will enable others skilled in the art to do the same.

In the ordinary method employed in laying concrete under water it has been considered necessary to use broken stone and coarse gravel with cement. This material thus mixed has been thrown directly on the water, which was inclosed to prevent washing away the cement, or has been dumped from boxes prepared for the purpose.

I have found, by repeated experiment, that it is impossible to obtain a good result from such a mixture. The varying velocity with which bodies fall through water is owing to their different specific gravities. If stone of a specific gravity of 2.5 are used with a cement of 1.4 the stone is in its descent washed entirely free from the cement, and is deposited on the bottom, while the cement, held in partial suspension, and moved by every new addition of the mixture, is finally deposited above the stone and gravel, after being rendered inert by the washing of the water.

My improvement consists, first, in rendering the water (which is inclosed in water-tight compartments or coffer-dams, to prevent any motion or current that may allow the escape of the concrete) strongly alkaline by the addition of a sufficient quantity of air-slaked lime. This renders the water less apt to hold the cement in suspension, and causes a more immediate precipitation of the cement. It also causes the concrete to attach itself the more firmly to adjoining masonry; second, sand, clean, sharp, and of fine grain is selected, and as near as possible of the same specific gravity as the cement, which is about 1.4, and weighing about eighty-eight pounds to the cubic foot, and carefully mixed with cement.

A good proportion for general use is three parts of sand to one of cement. The proportion may be varied, depending on the strength required of the cement. In this proportion it requires 4.25 cubic feet of dry cement and 12.75 cubic feet of dry sand to make 10 cubic feet of concrete, measured after being laid in place. The sand and cement are then mixed with water. Sufficient is added to make it thinner than is used in the plastic bétons, yet not watery or thin enough to run, as used in ordinary concrete.

A quantity of this mixture should then be placed on an incline, where it should be allowed to lie for a short time until the cement has formed a slight bond with the sand—five or ten minutes—varying with the quickness of the setting of the cement, and then the whole mass should be allowed to slide slowly down the incline or inclines, the bottom of which should be placed in the water, and the concrete evenly distributed by any suitable means.

A large mass should be collected before depositing, in which case the greater portion of the concrete does not come in contact with the water. Succeeding batches are prepared and deposited in the same way, and the process is continued until the space to be occupied by concrete is entirely filled.

Béton so deposited under water needs no ramming. The grains of sand close together with their irregular interstitial spaces filled with concrete.

We have then a homogenous compact mass, weighing about one hundred and forty-four pounds to the cubic foot, and a specific gravity of about 2.3, and capable of having a crushing-strain of over six thousand pounds per square inch, and a tensile strength of over three hundred pounds per square inch.

Having thus described my invention, what I claim is—

The method of laying concrete under water, as herein described, consisting in rendering the water strongly alkaline by air-slaked lime, and depositing into said water a mixture of sand and cement by means of an incline, substantially as and for the purpose set forth.

JOHN C. GOODRIDGE, JR.

Witnesses:
ERASTUS F. BROWN,
STEPHEN G. PEARSALL.